United States Patent [19]

Carpenter et al.

[11] 4,209,496
[45] * Jun. 24, 1980

[54] TREATMENT OF OFFGAS FROM ALUMINUM CHLORIDE PRODUCTION

[75] Inventors: L. Graydon Carpenter, Murrysville, Pa.; Donald L. Kinosz; Vito Cedro, III, both of Palestine, Tex.

[73] Assignee: Aluminum Company of America, Pittsburgh, Pa.

[*] Notice: The portion of the term of this patent subsequent to Jun. 5, 1996, has been disclaimed.

[21] Appl. No.: 35,607

[22] Filed: May 3, 1979

Related U.S. Application Data

[63] Continuation-in-part of Ser. No. 765,346, Feb. 3, 1977, abandoned, and Ser. No. 859,927, Dec. 12, 1977, Pat. No. 4,157,374.

[51] Int. Cl.$^2$ .............................................. C01B 7/00
[52] U.S. Cl. ..................... 423/210; 423/240; 423/241; 423/242; 423/245; 423/246; 423/336; 423/608; 423/624; 423/636; 423/210
[58] Field of Search .......... 423/210 R, 210 S, 224, 423/240 R, 240 S, 242 R, 242 S, 245 R, 245 S, 246, 336, 481, 488, 608, 612, 613, 592, 241, 624, 636; 260/544 K

[56] References Cited

U.S. PATENT DOCUMENTS

| | | | |
|---|---|---|---|
| 1,451,399 | 4/1923 | Low | 423/336 |
| 2,682,930 | 7/1954 | Krchma | 423/240 |
| 3,043,657 | 7/1962 | Hughes et al. | 423/614 |
| 3,043,659 | 7/1962 | Hughes et al. | 423/337 |
| 3,043,660 | 7/1962 | Hughes et al. | 423/337 |
| 3,314,753 | 4/1967 | Richert et al. | 423/240 |
| 3,376,113 | 4/1968 | Frevel | 423/240 |
| 3,615,163 | 10/1971 | Brzozowski | 423/240 |
| 3,642,441 | 2/1972 | Van Weert | 423/633 |
| 3,980,755 | 9/1976 | Black et al. | 423/240 |
| 4,157,374 | 6/1979 | Carpenter et al. | 423/242 |

FOREIGN PATENT DOCUMENTS

2600387 7/1976 Fed. Rep. of Germany ...... 260/544 K
51-108667 9/1976 Japan ........................................ 423/240

OTHER PUBLICATIONS

Hudson, R. "The Vapour Phase Hydrolysis of Non Metallic Chlorides", Proceedings of the 11th International Congress of Pure and Applied Chemistry, (London), 1947, pp. 297–305.

Primary Examiner—Brian E. Hearn
Attorney, Agent, or Firm—Glenn E. Klepac

[57] ABSTRACT

A process for treatment of aluminum chloride production offgas containing $Cl_2$, CO, $CO_2$, HCl, $COCl_2$, COS, $SO_2$, $N_2$, $SiCl_4$ and metal chlorides by reaction with water vapor in the presence of an alumina or low iron sand catalyst to convert $SiCl_4$ and metal chlorides to the corresponding oxides and HCl; subsequent reaction of $COCl_2$ with water vapor in the presence of an activated carbon catalyst to form $CO_2$ and HCl; and removal of HCl by contacting the offgas with liquid water. Reaction with steam in the presence of alumina catalyst prior to reaction with steam in the presence of an activated carbon catalyst prolongs the useful life of the activated carbon catalyst and avoids the necessity of removing $SiCl_4$ and metal chlorides from the offgas by adsorption onto dry activated carbon prior to contacting the activated carbon catalyst with offgas.

14 Claims, 1 Drawing Figure

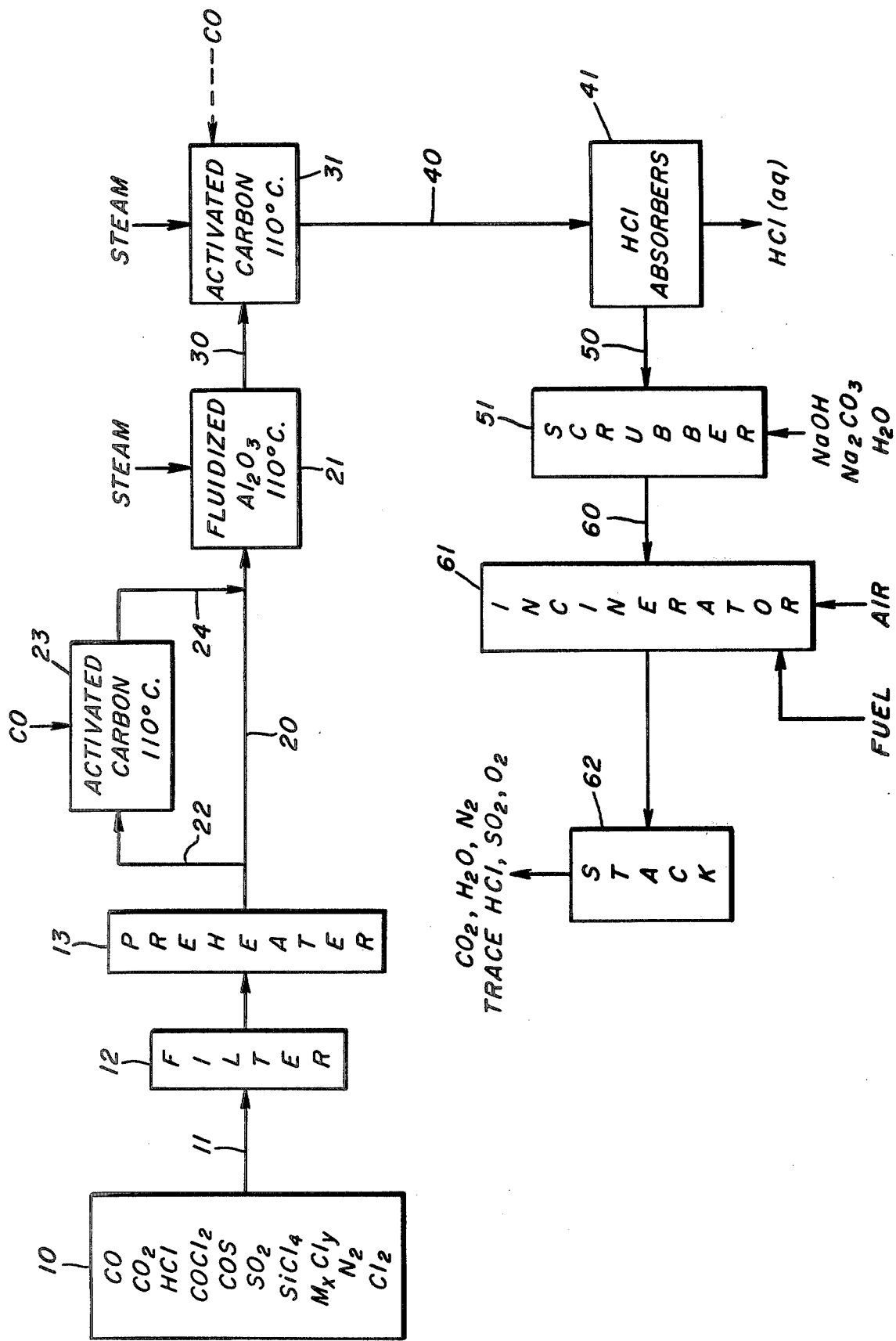

TREATMENT OF OFFGAS FROM ALUMINUM CHLORIDE PRODUCTION

CROSS-REFERENCE TO RELATED APPLICATIONS

This application is a continuation-in-part of U.S. application Ser. No. 765,346, filed Feb. 3, 1977 (now abandoned) and continuation-in-part of U.S. application Ser. No. 859,927, filed Dec. 12, 1977 now U.S. Pat. No. 4,157,374.

BACKGROUND OF THE INVENTION

The present invention relates to processes for treatment of offgas resulting from production of a metal chloride, such as aluminum chloride, by chlorination of the corresponding metal oxide or other metal-containing material. Such offgas typically contains $Cl_2$, CO, $CO_2$, HCl, $COCl_2$, COS, $SO_2$, $N_2$, $SiCl_4$ and metal chlorides. The present invention relates to a process for treatment of the offgas to remove all of the aforementioned components except $CO_2$ and $N_2$, which are released to the atmosphere after treatment of the offgas by the process of the invention.

A process for treatment of aluminum chloride offgas is disclosed in our co-pending U.S. application Ser. No. 959,927, filed Dec. 12, 1977. However, the preferred process disclosed therein suffers from the disadvantage of requiring adsorption of $SiCl_4$ and metal chlorides onto dry carbon adsorbers prior to hydrolysis of $COCl_2$ in a bed of activated carbon, and passing a stripping gas through the dry carbon adsorbers to remove the $SiCl_4$ and metal chlorides and to regenerate the dry carbon adsorbers. This preferred process has been found to be excessively costly because of the expense of heat and gases needed to regenerate the carbon adsorbers, the need to replace spent activated carbon in the adsorbers, and the production of excess weak aqueous HCl during hydrolysis of $COCl_2$. It is a principal object of the present invention to eliminate the foregoing disadvantages of the preferred process described in co-pending U.S. application Ser. No. 859,927.

Various methods for treatment of individual components of offgas from aluminum chloride production are taught in the prior art, but combination of such prior art methods would result in a method which is less than completely suitable for treatment of offgas from aluminum chloride production. For example, Richert et al U.S. Pat. No. 3,314,753 teaches removal of phosgene from a waste gas containing the same together with organic materials. Phosgene is decomposed by reaction with water vapor in the presence of activated carbon at a temperature of at least 120°–400° C., which is above the dew point of the water-phosgene mixture. Richert et al do not mention the presence of metal chlorides or $SiCl_4$, their removal from a gas stream or the disposal of such metal chlorides after removal. While activated carbon initially does catalyze the hydrolysis of $SiCl_4$ and metal chlorides as well as phosgene, it has been found that using only a single bed of activated carbon to catalyze such hydrolysis is not satisfactory because deposition of $SiO_2$ and metal oxides on the carbon resulting from hydrolysis of $SiCl_4$ and metal chlorides severely diminishes the effectiveness of catalysis with respect to phosgene hydrolysis.

A single bed of activated alumina is likewise not entirely suitable for treatment of aluminum chloride production offgas even though activated alumina initially catalyzes hydrolysis of $SiCl_4$, metal chlorides and phosgene. After significant quantities of $SiO_2$ and metal oxides are deposited on activated alumina catalyst, the catalyst becomes ineffective with respect to phosgene hydrolysis. Frevel et al U.S. Pat. No. 3,376,113 discloses activated alumina as a catalyst for hydrolysis of phosgene at temperatures of 95°–190° C.

Halogen-containing gases and vapors, such as phosgene ($COCl_2$), HCl, silicon tetrachloride, titanium tetrachloride, iron chloride, and aluminum chloride, as well as $Cl_2$ present in the offgas from an aluminum chloride reactor, must be removed from the gas before it is emitted to the atmosphere even when present at low levels. While it is well known, for example, that silicon tetrachloride will react with water to form a gelatinous precipitate commonly referred to as silica gel, this reaction is not desired, and, in fact, it is to be avoided because of the plugging of the pipelines and vessels which can occur upon formation of this gelatinous precipitate.

Brzozowski in U.S. Pat. No. 3,615,163 contacts titanium tetrachloride in waste gas with steam to avoid formation of a gelatinous precipitate. However, the patentee fails to mention the presence of any solid particles in the vessel in which reaction takes place. Similarly, in Low U.S. Pat. No. 1,451,399, silicon chloride is contacted with steam in an open container. There is no mention of catalysis by solid particles in the Brzozowski and Low patents.

In U.S. Pat. No. 3,980,755, Black et al teach the removal of chlorinated organics (ethers) by air using silica gel or activated alumina. This reference fail to teach or suggest that hydrolysis of $SiCl_4$ or metal chlorides would be enhanced by carrying out the reaction in the presence of solid particles.

Krchma in U.S. Pat. No. 2,682,930 teaches removal of titanium tetrachloride in a gas by adsorption onto a bed of activated carbon, activated alumina or activated silica in the absence of water, followed by either heating the bed or stripping it with an inert gas such as hot gaseous titanium tetrachloride or chlorine. There is no mention of conversion of the titanium tetrachloride to titanium oxide by hydrolysis and therefore no suggestion that such hydrolysis would be enhanced by being carried out in the presence of solid particles.

Low U.S. Pat. No. 1,451,399 indicates that if silicon chloride is contacted with a jet of steam at a temperature above the dehydration temperature of silicic acid, the silicon chloride will be hydrolyzed to form silica as well as hydrogen chloride by the reaction:

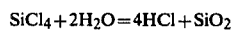

$$SiCl_4 + 2H_2O = 4HCl + SiO_2$$

However, in actual practice, it has been found that this conversion at ordinary steam pressures and at a temperature of about 100° C. results in low reaction rates.

R. F. Hudson in "The Vapor Phase Hydrolysis of Non-Metallic Chlorides", published in Volume 11 of the *International Congress of Pure Applied Chemistry London Proceedings* in 1947, indicated that this reaction must be carried out at much higher temperatures. He reports that Daubree noted that silicon tetrachloride and water vapor react at red heat in the presence of oxygen to give highly crystallized silica. Hudson then states that as oxygen and silicon tetrachloride do not react until higher temperatures are employed, this indicates a vapor phase hydrolysis at temperatures on the order of 700° C. Hudson then experimentally verified this by reporting experiments conducted in the temperature range of 25°–100° C. wherein no vapor phase hydrolysis of the silicon tetrachloride apparently occurred, at least without the presence of a small deposit of what he termed as "silicon". Hudson then states that he did observe reaction to obtain highly crystallized silica at a temperature of 400° C.

It is also known to produce metal oxides from metal halides in fluidized beds. For example, Hughes et al U.S. Pat. Nos. 3,043,657; 3,043,659 and 3,043,660 are addressed to the production of metal oxides such as titanium dioxide or silicon dioxide by reacting the corresponding chloride with oxygen or air in a fluidized bed at temperatures of 500° C. or higher. Van Weert U.S. Pat. No. 3,642,441 reacts metal chlorides with steam or water vapors in a fluidized bed. However, again the bed is operated at an elevated temperature of 700° C. or higher by the combustion of a gaseous hydrocarbon such as propane in the fluidized bed.

While the reactions reported in the Low and Hughes et al patents and in the Hudson article can be used for disposal of metal chlorides, such as $TiCl_4$ and $SiCl_4$, without formation of undersirable gelatinous products, the high temperatures proposed in the references make such processes economically unattractive. It must be recognized that these references were concerned with production of oxides rather than treatment of offgas usually containing only a minor or trace amount of metal chlorides. The present invention differs from these prior art processes by providing a process for treatment of offgas from aluminum chloride production by hydrolysis of metal chlorides without using excessive heat.

Additional objects and advantages of the present invention will become apparent to persons skilled in the art from the following specification, taken in conjunction with the drawing.

SUMMARY OF THE INVENTION

In accordance with the invention, offgas from production of a metal chloride containing $COCl_2$ and 15% by weight or less of gaseous metal chlorides is treated to convert those metal chlorides capable of hydrolyzing to oxides and to HCl by contacting the gas with water vapor at a temperature of 100°–200° C. while passing the offgas through a first reaction chamber containing a bed of solid particles selected from the class consisting of carbon and oxides of metals of groups IIA, IIIA, IVA, IVB and mixtures thereof. The offgas is then transferred to a second reaction chamber where any $COCl_2$ remaining in the gas is reacted with water vapor at a temperature of 100°–200° C. in the presence of another bed of solid particles selected from the class consisting of carbon and oxides of metals of groups IIA, IIIA, IVA, IVB and mixtures thereof to form $CO_2$ and HCl. Thereafter, HCl is removed from the offgas by contacting it with liquid water.

In a preferred embodiment, the offgas is first passed through a dust filter. If $Cl_2$ is present in a concentration greater than 100 ppm, it is reacted with CO in the presence of activated carbon to reduce $Cl_2$ content below 100 ppm. The offgas is then hydrolyzed in first and second reaction chambers to remove $SiCl_4$, metal chlorides and $COCl_2$, as described above. The HCl formed by hydrolysis is absorbed in liquid water to produce an aqueous hydrochloric acid solution.

The offgas is then scrubbed if necessary to remove sulfur oxides and incinerated to oxidize to $CO_2$ any partially oxidized carbon compounds such as CO.

BRIEF DESCRIPTION OF THE DRAWING

The sole FIGURE of the drawing is a flowsheet schematically illustrating the offgas treatment system of the invention.

DESCRIPTION OF THE INVENTION

In accordance with the invention, offgas at 10, which is an effluent gas of a chlorination system in which metal chloride is formed by chlorination of the corresponding metal oxide, passes through a line 11 to a dust filter 12. In a preferred embodiment, the metal chloride formed in the chlorination process is aluminum chloride, and the offgas includes CO, $CO_2$, HCl, $COCl_2$, COS, $SO_2$, $N_2$, $Cl_2$ and gaseous metal chlorides, such as aluminum chloride, silicon chloride and titanium chloride. Metal chlorides are sometimes referred to collectively in the specification and drawing as $M_xCl_y$. The term "metal chloride" as used herein is intended to include silicon chloride.

The dust filter 12 comprises a suitable ceramic or cloth filter medium, for example, wool, capable of removing particles as small as 10 microns in diameter. A heat exchanger or preheater 13 is provided at this point for heating the offgas to a temperatue in the range of about 100° to 200° C. The preheater 13 is turned on if insufficient heat is transferred to the offgas in the subsequent hydrolysis step to bring offgas temperature up to a desired level. Filtered offgas is then transmitted through line 20 to a combined chlorides hydrolyzer 21 or alternatively through line 22 to a chlorine converter 23 and then through line 24 to the hydrolyzer 21. The chlorine converter 23 is used when the offgas contains greater than 0.01% by weight $Cl_2$. It comprises a bed of activated carbon particles having a particle size of about 4 to 30 mesh (U.S. Sieve Series) and it reacts CO and $Cl_2$ to form $COCl_2$. If the offgas contains insufficient CO to convert the $Cl_2$ to $COCl_2$, then CO is added to bring the molar ratio of CO to $Cl_2$ up to about 2:1 to 3:1. Temperature at the outlet of the chlorine converter 23 is maintained at about 100°–200° C. and preferably about 110° C. by a suitable heat exchanger. When offgas from inlet line 22 is held in the converter 23 for a space time of at least 0.05 minute, concentration of $Cl_2$ in the outlet line 24 is reduced below 100 ppm.

The combined chlorides hydrolyzer 21 includes a first reaction chamber which contains a fluidized bed of particles, preferably alumina. In a particularly preferred embodiment, the aumina is partially calcined alumina (PCA) having an $Na_2O$ content of 0.35 wt.% and a surface area of 76 $m^2/g$. A suitable fluidized bed may also be maintained with alumina particles having a surface area in the range of about 25 $m^2/g$ to 150 $m^2/g$. In a particlarly preferred embodiment, the PCA has a total water content of about 1.5% by weight. Particles of other aluminas having total water content of from 0 to 34.8% and $Na_2O$ content of from 0 to 5% may also be utilized.

Particles of carbon or particles of oxides of metals of the classes IIA, IIIA, IVA, IVB or mixtures thereof may be substituted for alumina in the fluidized bed of the first reaction chamber. Common river sand can be used. When a fluidized bed of sand is utilized, the sand should be ground to 44–297 microns (−50 to +325 mesh U.S. Sieve Series) and preferably 74–149 microns (−100 to +200 mesh U.S. Sieve Series). However, when using such materials as river sand, it is necessary to provide a preliminary purification step to reduce the amount of iron in the sand. Typically, a river sand may have an iron content of from about 1-2% total iron. For reasons which are not entirely understood, the presence of iron appears to interfere with the process. Leaching of river sand with concentrated hydrochloric acid provides a convenient method of removing iron oxide from the sand. Such leaching reduces the iron content to as little as 0.3% by weight which reduces the operational problems. Preferably, when silica is used in the particle bed, it is a quartzite blasting sand. Such sand contains less than about 0.03% by weight iron.

Offgas entering the hydrolyzer 21 is reacted with steam at atmospheric pressure or higher. The hydrolyzer 21 is maintaned at a sufficiently high temperature (usually about 110° C.) to ensure that the hydrolysis reaction of the metal chloride and the water vapor is above the dew point of the blended gas stream to prevent formation of gelatinous material in the particle bed which could otherwise plug the reactor. Conveniently, this is done by using external heating such as an external steam jacket or the like.

It has been found that the conversion of silicon chloride is somewhat temperature dependent and is reduced upon raising the temperature significantly above 100° C. For example, for a given bed volume, velocity and molar ratio of $H_2O$ to $SiCl_4$, and using leached river sand as the fluidized bed catalyst, it has been found that a temperature of 100° C. at atmospheric pressure can result in a conversion of greater than 95% silicon chloride, while a temperature of 125° C. under otherwise identical conditions results in only 70% conversion, while a temperature of 150° C. with other conditions again remaining the same lowers the conversion to below 25%. Preferably, therefore, the temperature in hydrolyzer 21 should not rise above about 110°–115° C. To obtain the desired hydrolysis of the metal chloride to metal oxide, a large excess of water vapor is necessary. The molar ratio of $H_2O$ to $M_xCl_y$ should be at least about 10 and may be as high as 75. A molar ratio of $H_2O$ to $M_xCl_y$ of about 30 to 60 is preferred.

The space time of the gases within the hydrolyzer 21 may vary from as little as 0.11 minute when PCA is used to much longer time periods of as much as a minute or more depending upon the velocity of the gases passing therethrough, the ratio of water vapor to $M_xCl_y$ gas in the reactor and the height of the bed. The relationship of the space time to the bed height and velocity can be expressed by the following equation:

Space time = Bed Height/Velocity

The hydrolysis may be carried out in a static, fluidized or entrained bed. A fluidized bed is preferred. The velocity of the gases (total velocity of steam and metal chloride gases) passing through a fluidized bed should be at least about 0.1 centimeters/second to provide minimum fluidization in the particle size range specified. Preferably, the velocity is from about 1 to 200 centimeters/second.

When using fluidized beds having internal diameters of greater than 0.25 meters (10 inches), or the equivalent for noncircular beds, it has been found that the steam should enter the bottom of the bed while the metal chloride gases should be injected into the bed at a minimum of 0.05 meters of 0.076 meters (2-3 inches) above the steam entry. Furthermore, the entrance velocity of the metal chloride gases into beds of this size or larger should be at least 42.7 meters/second (140 feet/second) to prevent formations of lumps of bed material. For fluidized beds smaller than 0.25 meters, the point of injection and the velocity of the metal chloride gas has not been found to be critical. Typically, the length of the nozzle in the bed should be less than 1/5 of the internal diameter of the fluidized bed vessel. Conventional bag filters, for example, felted Teflon, are used to retain the particles in the fluidized bed vessel.

It should also be noted that the use of a fluidized bed appears to be particularly effective in eliminating the vapors or smoke resulting from the hydrolysis of the metal chloride, particularly titanium tetrachloride.

The bed height is also important and must be a minimum of about 10 centimeters, preferably about 50 to 60 or more centimeters in height, to again provide sufficient space time of the gases within the bed in the particle size range and gas velocity range specified.

The offgas, stripped of its metal chloride content, is transmitted through line 30 to a $COCl_2$ hydrolyzer 31. This hydrolyzer comprises a second reaction chamber partially filled with particles of a solid material selected from the class consisting of carbon and oxides of metals of the groups IIA, IIIA, IVA, IVB and mixtures thereof. The solid particles are preferably activated carbon having a mesh size of −4 to +30 (U.S. Sieve Series).

The second reaction chamber is maintained at a temperature of about 100°–150° C. and preferably about 100°–115° C. In the particularly preferred embodiment described herein, the temperature of the second reaction chamber is 110° C. The second reaction chamber is supplied with steam at atmospheric pressure or higher to hydrolyze any remaining $COCl_2$ in the offgas to HCl and $CO_2$. The offgas is maintained in the second reaction chamber for a space time of at least 0.035 minute before exiting at line 40. A higher temperature and longer space time may be necessary to ensure complete hydrolysis of $COCl_2$ if particles of a material other than activated carbon are contained in the second reaction chamber. If significant $Cl_2$ content reaches the second reaction chamber, CO should be added with the offgas to ensure removal of the $Cl_2$. Sufficient CO is added to the offgas entering the second reaction chamber to bring the molar ratio of CO to $Cl_2$ up to at least about 1.3:1 and preferably in the range of about 2:1 to 3:1.

The offgas exits from the $COCl_2$ hydrolyzer 31 at line 40, through which it proceeds to HCl absorbers 41. The absorbers 41 are preferably a series of three identical HCl absorbers, as described in greater detail in our co-pending application Ser. No. 859,927, filed Dec. 12, 1977. The absorbers 41 are maintained at a temperature of about 20°–100° C., and they may be packed beds filled with a polypropylene tower packing such as MASPAC (manufactured by Clarkson Controls and Equipment Company). The HCl absorbers may also be of other suitable designs, e.g. tray columns, which facilitate gas-liquid contact. Water or weak hydrochloric acid (0–20% HCl) is admitted to the top of an adsorber to flow countercurrently to the gas flow, thereby stripping HCl values from the offgas. The HCl values are removed via line 50 as an aqueous HCl solution containing about 32% by weight HCl.

Offgas leaving the HCl absobers 41 may pass to a scrubber 51 through line 50. Sufficient quantities of NaOH, $Na_2CO_3$ and $H_2O$ are added to the scrubber 51 to maintain pH at 5.6, thereby selectively scrubbing SO$_2$ but not CO$_2$ from the offgas flowing therein. The scrubber 51 may optionally be omitted if the SO$_2$ content in line 50 is sufficiently low.

Gas leaving the scrubber 51 through line 60 is conveyed to a CO incinerator 61 where CO is burned with air or oxygen to form CO$_2$. The gas leaving the incinerator is discharged to the atmosphere through a stack 62. Offgas so discharged contains CO$_2$, H$_2$O, and trace amounts of HCl and SO$_2$.

The offgas treatment system of the present invention can be constructed at a capital cost of about 20% less than the system described in co-pending application Ser. No. 859,927 because carbon adsorbers are eliminated. In addition, consumption of activated carbon is reduced by about 85%, and no stripping gas is needed to remove adsorbed chlorides from the carbon adsorbers. Production of weak (less than 20% by weight) HCl generated by hydrolysis of COCl$_2$ is also reduced.

Offgas from production by chlorination of aluminous materials may be treated at far less cost using the treatment system of the present invention compared with the system described in pending application Ser. No. 859,927.

The following examples serve to illustrate several alternative embodiments of the process of the invention.

EXAMPLE I

Partially calcined alumina (PCA) having a total H$_2$O content of 1.5% by weight was packed into a 5 cm diameter tubular reactor to a height of about 30.5 cm. The reactor was heated to a temperature of about 150° C., and the PCA bed was maintained in a fluidized condition by a steam sparger. A mixture of water vapor, N$_2$, SiCl$_4$ and COCl$_2$ at atmospheric pressure was admitted to the bottom of the reactor Superficial gas residence time was 0.2 minute. Feed rates of COCl$_2$ and SiCl$_4$ were 20.4 cm$^3$/min and 5.5 cm$^3$/min, respectively. Molar feed ratios for H$_2$O:COCl$_2$ and H$_2$O:SiCl$_4$ were 9.2 and 34, respectively. Test duration was 285 minutes. A concentration of 2 ppm COCl$_2$ was found in the gas leaving the fluidized PCA bed, and no SiCl$_4$ was detected. Conversion of COCl$_2$ to HCl and CO$_2$ was 99.98%.

EXAMPLE II

Example I was repeated under similar conditions except that the height of the fluidized PCA bed was increased to 46 cm. Bed temperature and pressure were maintained at 150° C. and one atmosphere, respectively. Superficial gas residence time was 0.31 minute. Feed rates of COCl$_2$ and SiCl$_4$ were 70.4 cm$^3$/min and 4.9 cm$^3$/min, respectively. Molar feed ratios for H$_2$O:COCl$_2$ and H$_2$O:SiCl$_4$ were 3.8 and 55.3, respectively. Test duration was 300 minutes. A concentration of 5 to 6 ppm COCl$_2$ was measured in gas leaving the PCA hydrolyzer bed. No SiCl$_4$ was detected. Conversion of COCl$_2$ to HCl and CO$_2$ was 99.99%.

EXAMPLE III

A column having a diameter of 5 cm was packed to a height of 30.5 cm with a bed of high purity dry sand. The sand bed was maintained in a fluidized condition by a steam sparger. Above the sand bed, the column was packed to a height of 30.5 cm with a bed of activated carbon having a mesh size of −4 to +8 (U.S. Sieve Series). Both beds were maintained at 100° C. A mixture of water vapor, N$_2$, SiCl$_4$ and COCl$_2$ at atmospheric pressure was admitted to the bottom of the reactor. Superficial gas residence time in both beds was 0.11 minute. Feed rates of COCl$_2$ and SiCl$_4$ varied from 17 to 20 cm$^3$/min and from 7 to 10 cm$^3$/min, respectively. Molar feed ratios of H$_2$O:COCl$_2$ and H$_2$O:SiCl$_4$ varied from 20 to 60 and from 48 to 100, respectively. No SiCl$_4$ or COCl$_2$ was detected in the gas leaving the activated carbon bed after 80 hours of operation.

EXAMPLE IV

Example III was was repeated under similar conditions except that the reactor was fed with a mixture of CO, Cl$_2$, N$_2$, HCl and water vapor. Bed temperature was maintained at 100° C. and superficial gas residence time in both beds remained at 0.11 minute. Feed rates of Cl$_2$ and HCl were 56 cm$^3$/min and 268 cm$^3$/min, respectively. Molar feed ratios of CO:Cl$_2$ and H$_2$O:Cl$_2$ were 2.7 and 2.5, respectively. No COCl$_2$ or Cl$_2$ was detected in the exit gas during a three and one-half hour test.

In each of Examples I–IV, HCl is removed from the exit gas by contacting the gas with liquid water at a temperature of 20° to 100° C.

EXAMPLE V

The carbon bed of Example III was fed a mixture of CO, Cl$_2$, N$_2$, HCl and water vapor with varying proportions of CO, Cl$_2$ and H$_2$O and varying gas residence times at a temperature of 100° C. to determine the minimum amounts of CO and steam required to convert Cl$_2$ in the reactor offgas to HCl. Gas residence time (T) varied from 0.036 to 0.074 minutes. The exit gas was passed through a series of water bubblers at 20°–100° C. which were later titrated to determine the quantity of HCl produced in the hydrolyzer. Results are summarized in Table 1.

Table 1

| | | | Offgas | | |
|---|---|---|---|---|---|
| | CO/CL$_2$** | H$_2$O/Cl$_2$** | T (minutes) | ppm Cl$_2$ | ppm COCl$_2$ | Run Time |
| 1. | 1.14 | 4 | .036 | 0 | 0 | 285 min. |
| 2. | 4 | 4.5 | .037 | 0 | 0 | 110 |
| 3. | 5* | 5 | .036 | 0 | 0 | 333 |
| 4. | 2* | 2 | .038 | 0 | 0 | 405 |
| 5. | 2* | 1.16 | .038 | 0 | 0 | 270 |
| 6. | 2* | 0.85 | .040 | 0 | 45 | 130 |
| 7. | 1.23 | 2.04 | .037 | 8 | 0 | 360 |
| 8. | 1.8 | 2.8 | .036 | 4 | 0 | 120 |
| 9. | 1.3 | 1.73 | .037 | 13 | 0 | 210 |
| 10. | 1.2 | 2.8 | .036 | 42 | 0 | 305 |
| 11. | 1.18 | 1.25 | .037 | 50 | 1 | 200 |
| 12. | 1.35 | 2.24 | .074 | .2 | 0 | 365 |
| 13. | 0.97 | 2.3 | .074 | 56 | 0 | 315 |

*(The actual ratio is probably lower.)
**(Volume ratio)

The above results show that hydrolysis occurs after the Cl$_2$ has been converted to COCl$_2$, with only 20% excess of steam (H$_2$O/Cl$_2 \geq 1.2$) being sufficient. A volume ratio of 1.3 parts CO to 1.0 parts Cl$_2$ is required for complete conversion of Cl$_2$ to COCl$_2$.

In addition, these results indicate that a minimum gas residence time of about 0.035 is needed to remove COCl$_2$ from the offgas.

Additional examples illustrating principles of operation of the offgas treatment system of the present invention are described in our co-pending application Ser. No. 859,927. The disclosure of said co-pending application is hereby incorporated by reference.

With the foregoing detailed description of our invention in mind, numerous changes and modifications may be made therein without departing from the spirit and scope of the invention as set forth in the following claims.

What is claimed is:

1. A process for treatment of offgas from production of a metal chloride by chlorination of the corresponding metal oxide, said offgas comprising $COCl_2$, $SiCl_4$ and gaseous metal chlorides, said process comprising the steps of
   (a) reacting $SiCl_4$ and metal chlorides in the offgas with water vapor for a space time of at least 0.11 minute in a first reaction chamber containing a bed of solid particles selected from the class consisting of carbon and oxides of metals of the groups IIA, IIIA, IVA, IVB and mixtures thereof, said offgas being maintained at a temperature of about 100° to 200° C. in the bed, thereby forming $SiO_2$, metal oxides, $CO_2$ and HCl;
   (b) transferring the offgas from the first reaction chamber to a second reaction chamber containing a bed of solid particles selected from the class consisting of carbon and oxides of metals of groups IIA, IIIA, IVA, IVB and mixtures thereof, said offgas being maintained at a temperature of about 100° to 200° C. in the second reaction chamber;
   (c) reacting $COCl_2$ in the offgas with water vapor in the second reaction chamber for a space time of at least 0.035 minute, thereby forming $CO_2$ and HCl and reducing the concentration of $COCl_2$ in the offgas to below 10 ppm; and
   (d) removing HCl from the offgas by contacting the offgas with liquid water at a temperature of from 20° to 100° C. to remove HCl vapors therefrom.

2. The process of claim 1 wherein the offgas also comprises 0.01 to 20% by weight $Cl_2$, and further comprising the additional step of reacting $Cl_2$ in the offgas with CO for a space time of at least 0.05 minute prior to performing step (a) of claim 1, said additional step being performed in a reaction chamber containing activated carbon with the gas being maintained at a temperature of about 100° to 200° C. and with sufficient CO to reduce content of $Cl_2$ in the offgas to below 100 ppm.

3. The process of claim 1 wherein the offgas also comprises $SO_2$, and further comprising the step of scrubbing the offgas in a scrubber maintained at a pH of about 5.6 by addition of sufficient NaOH or $Na_2CO_3$ to remove $SO_2$ from the offgas.

4. The process of claim 1 wherein the offgas also comprises partially oxidized carbon compounds, and further comprising the step of incinerating the offgas to oxidize any partially oxidized carbon compounds to $CO_2$.

5. The process of claim 1 wherein the first reaction chamber contains particles of sand having an iron content of less than about 0.03% by weight and is maintained at a temperature of about 100° to 115° C.

6. The process of claim 1 wherein the first reaction chamber contains particles of partially calcined alumina and is maintained at a temperature of about 150° C.

7. The process of claim 1 wherein the solid particles in the second reaction chamber are activated carbon.

8. The process of claim 7 wherein the solid particles in the second reaction chamber have a particle size range of −4 to +30 mesh U.S. Sieve Series.

9. The process of claim 1 wherein the $H_2O/M_xCl_y$ concentration ratio in the first reaction chamber is at least 10 and as high as 75 to ensure complete hydrolysis of metal chlorides.

10. The process of claim 1 wherein the offgas entering the second reaction chamber also includes $Cl_2$, and further comprisng the step of adding CO to the offgas so that the molar ratio of CO to $Cl_2$ in the offgas in the second reaction chamber is at least about 1.3:1, thereby to convert the $Cl_2$ to $COCl_2$.

11. A process for treatment of offgas from production of aluminum chloride by chlorination of aluminous material, said offgas comprising $SiCl_4$, gaseous metal chlorides, $COCl_2$ and from 0.01 to 20% $Cl_2$, said process comprising the steps of
   (a) reacting $Cl_2$ in the offgas with CO in a first reactor containing activated carbon for a space time of at least 0.05 minute at a temperature of about 100° to 200° C., thereby forming $COCl_2$ and reducing the content of $Cl_2$ in the offgas to below 100 ppm;
   (b) transferring the offgas from the first reactor to a second reactor containing a fluidized bed of particles of an oxide of metals of the groups IIA, IIIA, IVA, IVB and mixtures thereof;
   (c) reacting $COCl_2$, $SiCl_4$ and metal chlorides in the offgas with water vapor in the second reactor at a temperature of about 100° to 200° C. for a space time of at least 0.20 minute, thereby forming $SiO_2$, metal oxides, $CO_2$ and HCl, and reducing the content of $COCl_2$ in the offgas to below 10 ppm; and
   (d) removing HCl from the offgas by contacting the offgas with liquid water at a temperature of about 20° to 100° C.

12. The process of claim 11 wherein the first reactor contains particles of activated carbon maintained at a temperature of about 150° C., and the second reactor contains a fluidized bed of particles of alumina maintained at a temperature of about 150° C.

13. A process for treatment of offgas from the production of aluminum chloride by chlorination of aluminous material, said offgas comprising $SiCl_4$, gaseous metal chlorides and $COCl_2$, said process comprising the steps of
   (a) reacting $SiCl_4$ and metal chlorides in the offgas with water vapor for a space time of at least 0.11 minute in a first reaction chamber containing a fluidized bed of particles of an oxide of metals of the groups IIA, IIIA, IVA, IVB and mixtures thereof, said offgas being maintained at a temperature of about 100° to 115° C. in the bed, thereby forming $SiO_2$, metal oxides, $CO_2$ and HCl;
   (b) transferring the offgas from the first reaction chamber to a second reaction chamber containing a bed of activated carbon;
   (c) reacting any $COCl_2$ remaining in the offgas with water vapor in the second reaction chamber at a temperature of about 100° to 150° C. for a space time of at least 0.035 minute, thereby forming $CO_2$ and HCl and reducing the content of $COCl_2$ in the offgas to below 10 ppm; and
   (d) removing HCl from the offgas by contacting the offgas with liquid water at a temperature of from 20° to 100° C.

14. The process of claim 13 wherein the first reaction chamber contains particles of silicon dioxide maintained at a temperature of about 110° C., and the second reaction chamber contans particles of activated carbon maintained at a temperature of about 110° C.

* * * * *